(12) United States Patent
Gibson (10) Patent No.: US 11,801,786 B2
(45) Date of Patent: Oct. 31, 2023

(54) MOBILE BUNKHOUSE TRAILER

(71) Applicant: Jag Mobile Solutions, Inc., Howe, IN (US)

(72) Inventor: William L Gibson, Angola, IN (US)

(73) Assignee: JAG MOBILE SOLUTIONS, INC., Howe, IN (US)

( * ) Notice: Subject to any disclaimer, the term of this patent is extended or adjusted under 35 U.S.C. 154(b) by 0 days.

(21) Appl. No.: 17/683,900

(22) Filed: Mar. 1, 2022

(65) Prior Publication Data
US 2022/0274520 A1    Sep. 1, 2022

Related U.S. Application Data

(60) Provisional application No. 63/154,844, filed on Mar. 1, 2021.

(51) Int. Cl.
*B60P 3/38* (2006.01)

(52) U.S. Cl.
CPC ...................... *B60P 3/38* (2013.01)

(58) Field of Classification Search
None
See application file for complete search history.

(56) References Cited

U.S. PATENT DOCUMENTS

| | | | | |
|---|---|---|---|---|
| 2,364,595 A * | 12/1944 | Tully | | B61D 1/08 |
| | | | | 296/64 |
| 3,118,187 A * | 1/1964 | Alimanestiano | | E04B 1/348 |
| | | | | D25/4 |
| 4,759,582 A * | 7/1988 | Kutzner | | B60P 3/34 |
| | | | | 5/118 |
| 10,384,504 B2 * | 8/2019 | Nozzarella | | B60P 3/38 |
| 2022/0072990 A1 * | 3/2022 | Mitchell | | B60P 3/38 |

* cited by examiner

*Primary Examiner* — Joseph D. Pape
(74) *Attorney, Agent, or Firm* — Barnes & Thornburg LLP (57) ABSTRACT

A bunkhouse trailer is provided that includes a plurality of bunk bed assemblies. The trailer has a plurality of interior barrier walls defining isolated living spaces between the lower and upper beds in each of the bunk bed assemblies. The individual accommodations for each user eliminates shared spaces where surface contamination may lead to disease transmission. In some embodiments, the air handling within each individual accommodation is configured to reduce the risk of cross-contamination between users.

6 Claims, 5 Drawing Sheets

MOBILE BUNKHOUSE TRAILER

RELATED APPLICATION

This application claims the benefit of U.S. Provisional Application Ser. No. 63/154,844 filed Mar. 1, 2021 for a "Mobile Bunkhouse Trailer," which is hereby incorporated by reference in its entirety.

TECHNICAL FIELD

This disclosure relates generally to a bunkhouse trailer; in particular, this relates to a bunkhouse trailer with a plurality of individual interior spaces that are isolated from each other to reduce the risk of disease spreading between users.

BACKGROUND

A bunkhouse trailer includes a one or more sets of bunk beds. Although bunk beds increase the accommodations for the trailer, the users have needed to share common spaces. While this shared arrangement may be suitable in some circumstances, there can be risks associated with shared accommodations. For example, there is a risk of infectious diseases and/or germs being spread between occupants of the trailer due to the shared spaces. In such a situation, persons sharing a space may contaminate the shared space for the other occupants, both in terms of touching surfaces and sharing air within the space.

Therefore, there is a need for a bunkhouse trailer with a plurality of isolated, interior spaces for occupants to stay.

SUMMARY

According to one aspect, this disclosure provides a trailer with a trailer body defining an interior space. The trailer includes a bunk bed assembly within the interior space such that the bunk bed assembly comprises a lower bed and an upper bed. There are a plurality of barrier walls defining a first individual space that includes the lower bed and a second individual space that includes the upper bed. The trailer has a first door movably attached to the trailer body to access the first individual space and a second door movably attached to the trailer body to access the second individual space. The plurality of barrier walls prevent air flow between the first individual space and the second individual space, thereby isolating the first individual space and the second individual space from each other.

According to another aspect, this disclosure provides a trailer with a trailer body defining an interior space. The trailer includes a plurality of bunk bed assemblies within the interior space such that each of the plurality of bunk bed assemblies include a lower bed and an upper bed. There are a plurality of barrier walls associated with each of the plurality of bunk bed assemblies, wherein the plurality of barrier walls define isolated interior spaces between the lower bed and the upper bed for each of the plurality of bunk bed assemblies. A first exterior door is provided that is movably attached to the trailer body to access a first individual space associated with the lower bed defined by the plurality of barrier walls. The trailer also includes a second exterior door movably attached to the trailer body to access a second individual space associated with the upper bed defined by the plurality of barrier walls. The plurality of barrier walls prevent air flow between the first individual space and the second individual space, thereby isolating the first individual space and the second individual space from each other.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure generally relates to a trailer that provides individual accommodations for a plurality of persons in which each individual accommodation is isolated from the other accommodations of the trailer. Although the example trailer described herein is configured to provide accommodations for 12 persons, the trailer could accommodate more or less persons depending upon the circumstances. In some embodiments, this disclosure solves a technical problem of creating individual, isolated spaces for a plurality of persons to reduce the risk of cross-contamination between the individuals that are staying in the trailer. For example, in some embodiments, each individual space within the trailer has individual air return vents that are spaced apart remote from fresh air intake vent(s) to reduce the risk that return air will contaminate fresh air introduced into the individual spaces. Likewise, since each person has an individual accommodation, only the user assigned to a specific space will touch the surfaces within that particular space.

Figure 1:
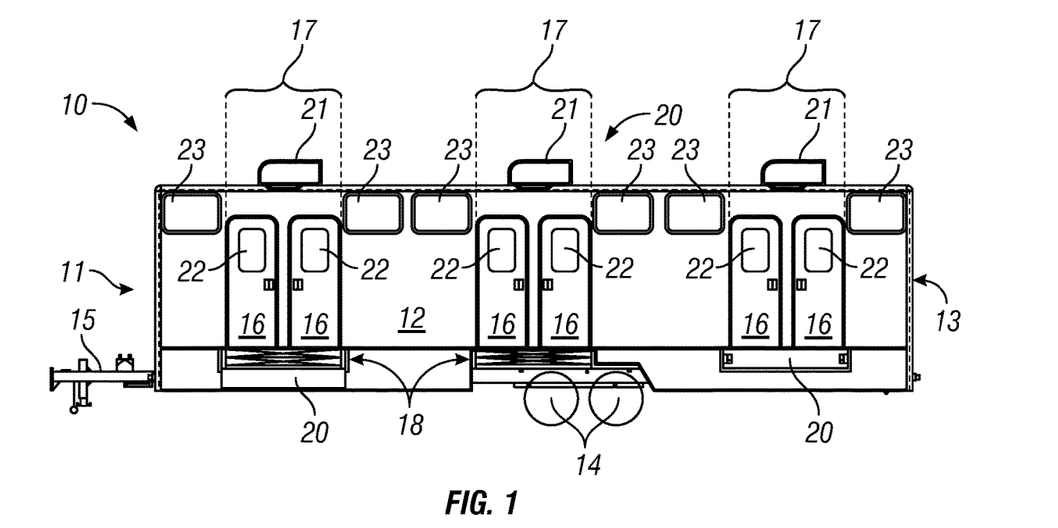
FIG. 1 is a left side view of an example trailer according to an embodiment of this disclosure.

FIG. 1 is a left side view of an example trailer 10 that can provide individual, isolated accommodations for 12 persons. As shown, the trailer 10 includes a front end 11 and a rear end 13. In the example shown, the trailer 10 includes a trailer body 12 that defines an interior space. As shown, the trailer 10 includes a plurality of wheels 14 for moving the trailer 10 between various locations. For example, as shown, the trailer 10 includes a tongue 15 that could be connected with a vehicle for hauling the trailer 10 to various destinations. Although the example trailer 10 includes a tongue 15 for purposes of example, the term "trailer" is broadly intended to encompass both a transport device that needs to be hauled and a transport device that is part of the vehicle itself, such as a motor home, which does not need a separate vehicle to be hauled.

In this example, there are a plurality of doors 16 for entering the individual interior spaces. As shown, there are six doors for entering the interior spaces—one for each individual space within the trailer 10. In the embodiment shown, the doors 16 are grouped in pairs 17 that are in close proximity so a single set of steps 18 may be used with each pair of doors 16. Of course, depending on the circumstances, each door 16 could have a separate set of steps 18 for entering into that particular door 16.

Figure 4:
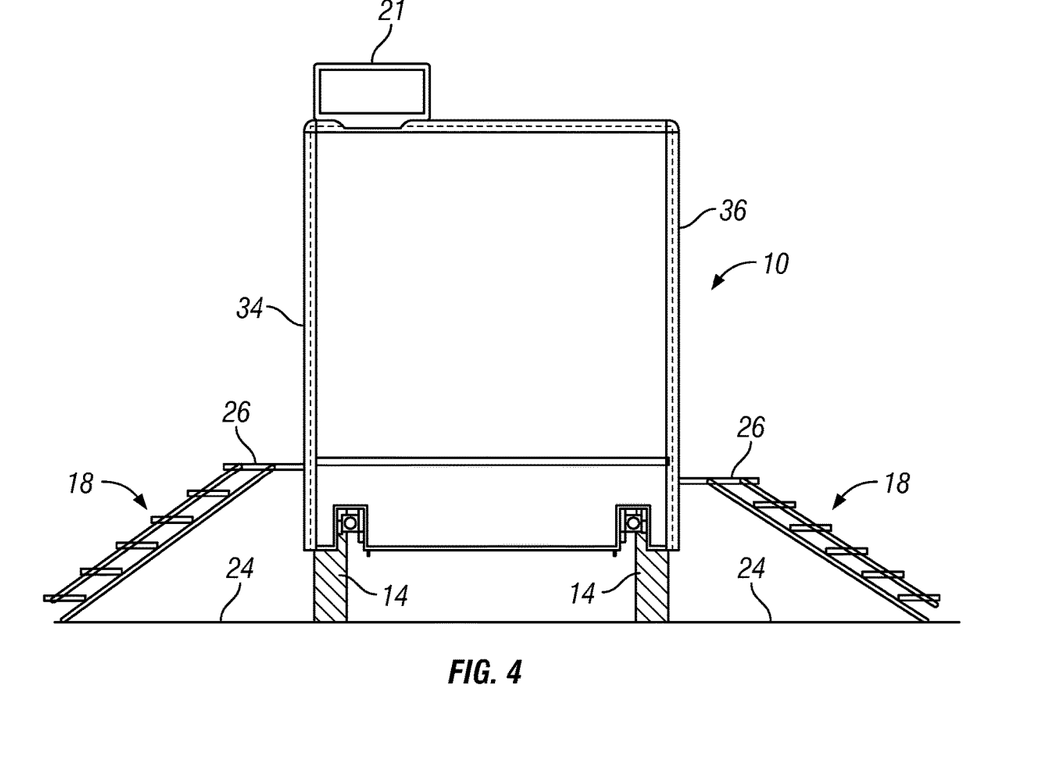
FIG. 4 is a rear view of the example trailer shown in FIG. 1 with at least a portion of the step assemblies in an extended position.

As shown, the steps 18 are movable between a retracted position as shown in FIG. 1 and an extended position shown in FIG. 4. In some cases, the steps 18 may be covered by a door 20 in the retracted position to prevent contaminates from entering into the steps 18 while the trailer 10 is being transported. A user can climb the steps 18 to transition between the ground and the door 16. As shown, the doors 16 may include windows 22 for each individual interior space to provide light. In some cases, there may be an optional window 23 for each individual space to provide additional light within the space. In addition to light, the window 23 provides a secondary emergency egress point to exit each room. This means that if the door 16 is blocked or obstructed, the window 23 for the individual space with provide a second way of egress in an emergency situation. In this manner, each individual space provides at least two ways of egress, one with the door 16 and the other with the window 23. Although this example shows the window 23 on the side wall, the window 23 could be in another external wall or ceiling to provide a secondary emergency egress point. Additionally, although a window is shown for purposes of example, other emergency egress devices could be used, such as a secondary egress door or hatch.

Also shown in FIG. 1 is a plurality of HVAC units 21 mounted to the roof that may be configured to control temperature and climate within the interior spaces of the trailer 10. As discussed herein, the HVAC units 21 are configured to introduce a positive pressure within each individual space so air is continuously being expelled out of return vents. With the return vents remote from the fresh air intake for the HVAC units 21, this prevents cross contamination of air between the individual units within the trailer 10.

Figure 2:
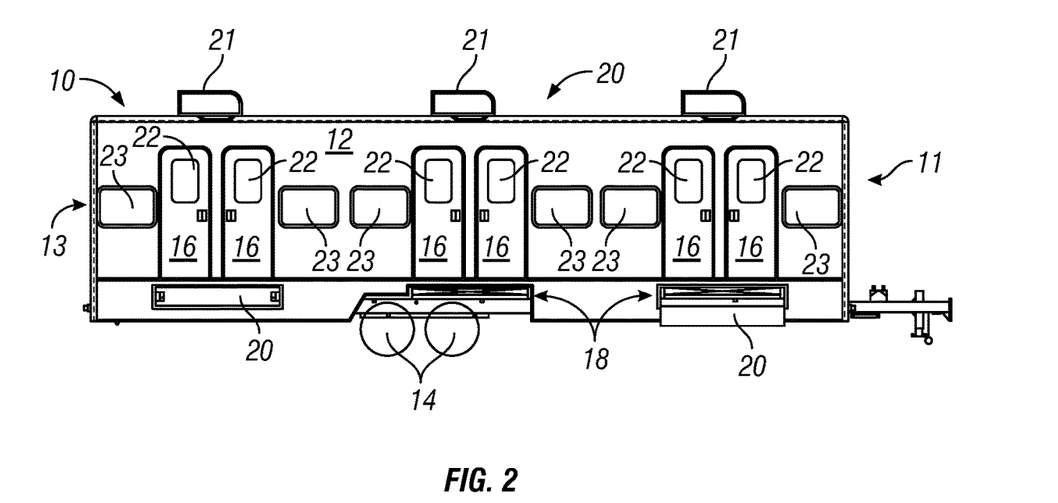
FIG. 2 is a right side view of the example trailer shown in FIG. 1.

FIG. 2 illustrates the right side of the trailer 10. As can be seen, similar to the left side shown in FIG. 1, there are a plurality of doors 16 from which a user may enter each individual space within the trailer 10. In the example shown, there are six doors on the right side of the trailer 10 because there are six individualized spaces that can be accessed from the right side of the trailer 10 for a total of 12 individual interior spaces within the trailer 10 in the example shown. Of course, if the trailer 10 were configured with a different number of individual interior spaces, the number of doors would change accordingly.

As with the left side of the trailer 10, the right side includes a plurality of steps 18 from which a user can transition between the ground and the elevated trailer floor. Likewise, in the example shown, there are a plurality of windows 23 to provide light to the interior of each individual interior space. In the example shown, the windows 23 may be positioned vertically based on the position of bunk beds within the trailer 10. For example, the window 23 on one side may be positioned above the upper bunk bed and the window 23 on the other side may be positioned between the upper and lower bunk bed (See FIGS. 5 and 6).

Figure 3:
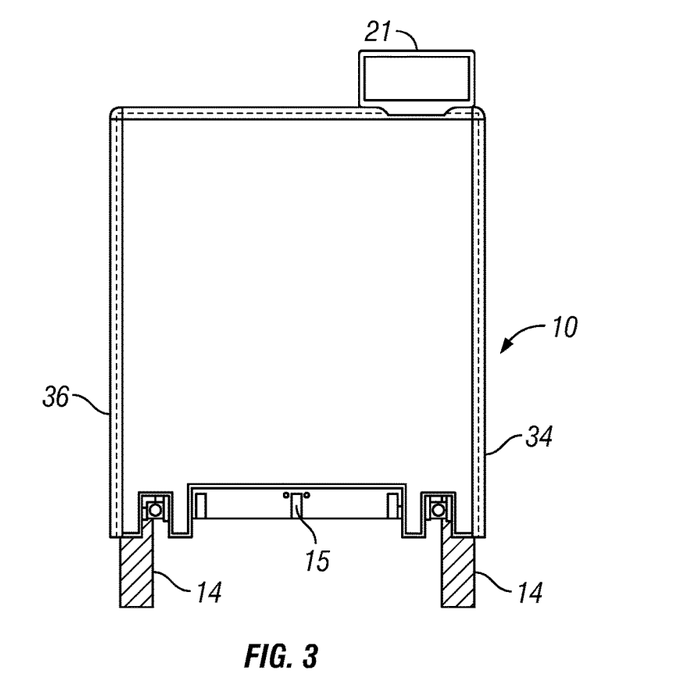
FIG. 3 is a front view of the example trailer shown in FIG. 1.

FIG. 3 is a front view of the example trailer 10 shown in FIGS. 1-2. In this view, the tongue 15 for hauling the trailer 10 can be seen. Likewise, the wheels 14 for moving the trailer 10 can be seen. As shown, one of the HVAC units 21 can be seen. In the example shown, the HVAC unit 21 is offset on one side mounted to the roof of the trailer 10 based on the ducting configuration of the interior of the trailer 10. Of course, the exact position of each HVAC unit 21 could vary depending on the circumstances. Likewise, the number of HVAC units 21 could vary depending on the circumstances.

FIG. 4 illustrates a rear view of the example trailer 10 shown in FIGS. 1-2. In the example shown, the steps 18 are illustrated in the extended position. In this position, a user may transition from the ground 24 to a platform 26 for transitioning to the floor of the trailer 10 using the steps 18. An example of retractable steps that could be used with the trailer 10 is shown in U.S. Pat. No. 10,525,891 filed Feb. 4, 2019 for a "Trailer Step Assembly," which is hereby incorporated by reference. As shown, there is a set of steps 18 extending on each side of the trailer 10 so users can access doors 16 on either the left or right sides of the trailer 10.

Figure 5:
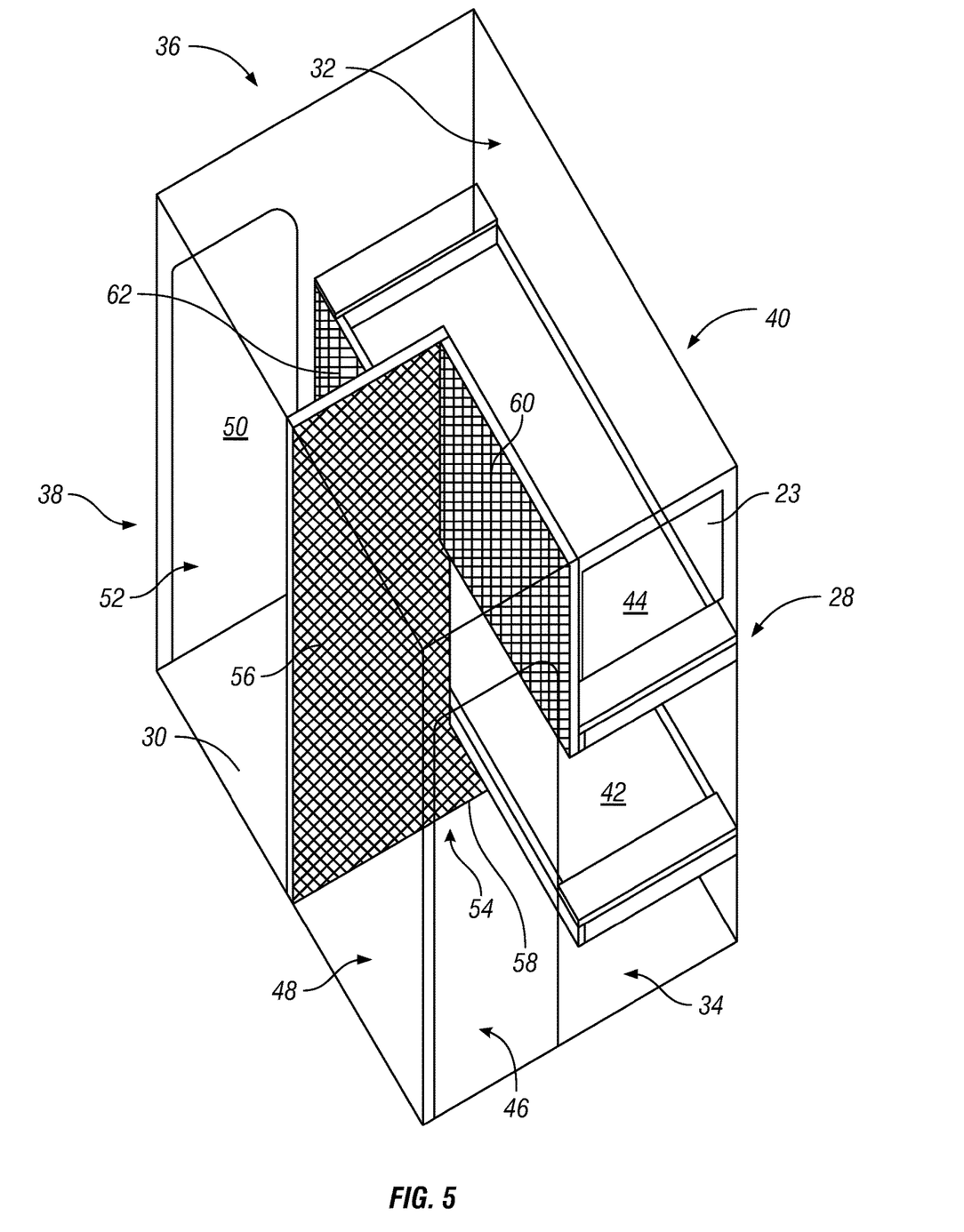
FIG. 5 is a left side perspective view of a portion of the interior space of the example trailer shown in FIG. 1.
Figure 6:
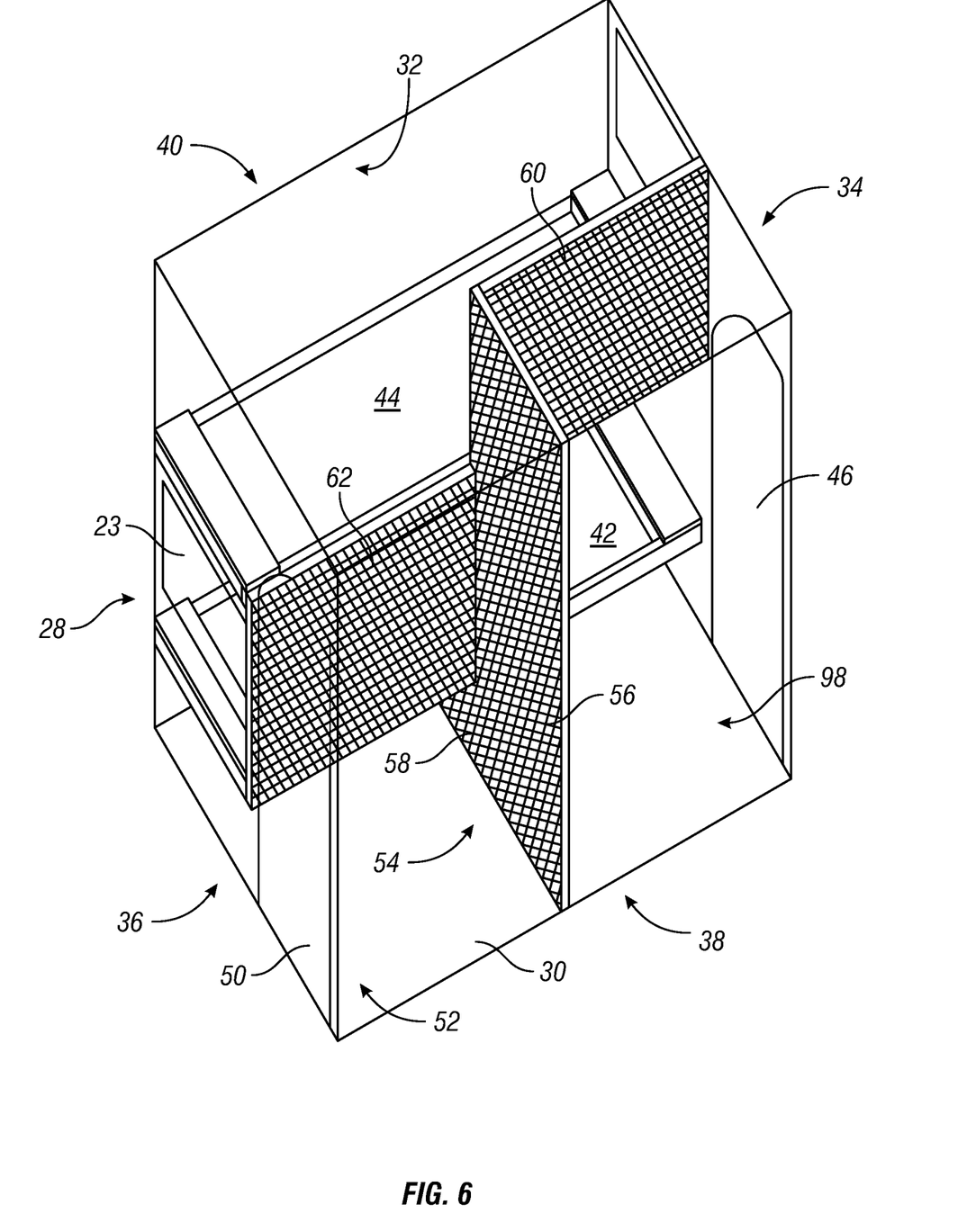
FIG. 6 is a right side perspective view of the interior space shown in FIG. 5.

FIGS. 5-6 illustrate a portion of the trailer 10 in which a set of bunk beds 28 are positioned such that each person has an individual space for each respective bed. As discussed herein, the example trailer 10 includes individual accommodations for 12 persons so the trailer 10 includes 6 sets of bunk beds in this example. However, more or less sets of bunk beds could be provided depending on the circumstances.

In the example shown, the interior space for each set of bunk beds 28 includes a floor 30, a ceiling 32, a first exterior wall 34, a second exterior wall 36, a first side wall 38, and a second side wall 40. The set of bunk beds 28 includes a lower bed 42 and an upper bed 44. As shown, the person with access to the lower bed 42 is walled off from the person with access to the upper bed 44; accordingly, the person using the accommodations with the lower bed 42 cannot touch any surfaces of the person using the upper bed 44, and vice versa. As discussed herein, each individual space (e.g., separate space for lower bed 42 and upper bed 44 accommodations) has separate air return vents 76 (See FIG. 8), which are remote from fresh air intake vents for the HVAC units 21. Additionally, the HVAC units 21 may be configured to continuously put the accommodations under positive pressure to constantly move air out of the individual units. In this manner, the air within the accommodations for the lower bed 42 is separated from the air for the upper bed 44 so there is no shared air between the accommodations for the lower bed 42 and the accommodations for the upper bed 44.

In the example shown, there is shown a first door 46 on the first exterior wall 34 for entering a first individual space 48 and a second door 50 on the second exterior wall 36 for entering a second individual space 52. As shown, the first individual space 48 has access to the lower bed 42 and the second individual space 52 has access to the upper bed 44. As shown, a window 23 is provided on the first exterior wall 34 above the upper bed 44 to provide light into the second individual space 52 and a window 23 is provided on the second exterior wall 36 between the beds 42, 44 to provide light into the first individual space 48. As discussed herein, the doors 46, 50 may optionally include windows to let additional light into the spaces 48, 52.

As shown, there are a plurality of barrier walls separating the first individual space 48 and the second individual space 52. As shown, a first barrier wall 54 separates the first individual space 48 and the second individual space 52 along an axis transverse to a longitudinal axis of the beds 42, 44. In the example shown, the first barrier wall 54 includes a first portion 56 that extends from the floor 30 to the ceiling 32 between the first side wall 38 and the side of the beds 42, 44 not connected to the second side wall 40. As shown, the first barrier wall 54 includes a second portion 58 that extends between the floor 30 and the bottom of the lower bed 42 all the way between the first side wall 38 and the second side wall 40.

As shown, there is a second barrier wall 60 that extends from the bottom of the upper bed 44 to the ceiling 32 between the first exterior wall 34 and the first barrier wall 54. Additionally, there is a third barrier wall 62 that extends from the lower bed 42 to the upper bed 44 between the second exterior wall 36 and the first barrier wall 54. With this arrangement, the barrier walls 54, 60, and 62 isolate the first individual space 48 from the second individual space 52. The barrier walls 54, 60, and 62 are made from material that prevents air from passing therethrough, such as metal, wood, plastic, drywall, etc. In some cases, there may be sealing between the barrier walls 54, 60, 62, side walls 38, 40, and/or exterior walls 34, 36 to prevent air flow between the first individual space 48 and the second individual space 52. The sealing could be embodied as any sealant that could block fluid flow (e.g., air flow) between the first individual space 48 and the second individual space 52, including but not limited to a seal caulk, silicone caulk, sealing tape, sealing putty, etc.

Figure 7:
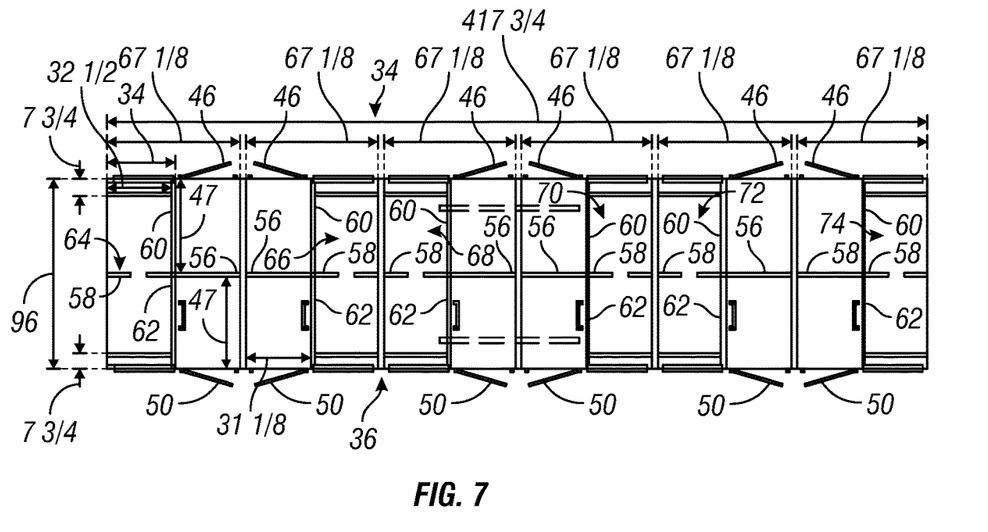
FIG. 7 is a top view of the example trailer shown in FIG. 1 with the roof removed to expose the floor plan.

Referring now to FIG. 7, there is shown an example floor plan for the trailer 10 to accommodate up to 12 persons with six sets of bunk beds. In the example floor plan shown, there is a first set of bunk beds 64, a second set of bunk beds 66, a third set of bunk beds 68, a fourth set of bunk beds 70, a fifth set of bunk beds 72, and a sixth set of bunk beds 74. Each set of bunk beds 64, 66, 68, 70, 72, and 74 includes a lower bed and an upper bed so there is accommodations for 12 persons in this configuration. The barrier walls 54, 60, and 62 would have a similar configuration as shown in FIGS. 5 and 6 to isolate the accommodations for each set of bunk beds.

Figure 8:
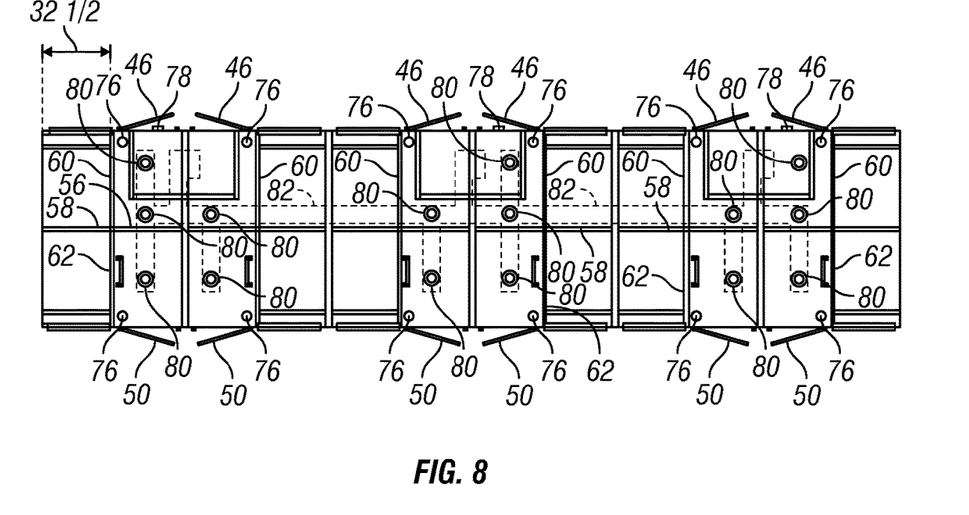
FIG. 8 is the example floor plan shown in FIG. 7 with an example ducting layout shown in ghost.

FIG. 8 illustrates an example ducting layout for the floor plan shown in FIG. 7. In this example, there are three HVAC units 21 corresponding to the ducting layout shown; however, as discussed herein, there may be more or less HVAC units 21 depending on the circumstances.

In the example shown, each of the individual spaces includes a return vent 76 for expelling air out of each individual interior space. The return vents 76 are remote from the fresh air intake vent 78 so that the air expelled from the return vents 76 is not introduced into the fresh air intake vents 78. For example, the return vents 76 could be mounted to the floor so air is expelled underneath the trailer 10 while the fresh air intake vents 78 could be installed near the ceil, which is physically remote from the return vents 76. Here, there are three fresh air intake vents 78 due to use of three HVAC units 21, but more or less fresh air intake vents 78 could be provided depending on the circumstances.

As shown, there are a plurality of supply vents 80 that supply conditioned air from the HVAC units 21. In this example, several of the supply vents 80 are fluidly connected with ducting 82 so that conditioned air is supplied within each individual space. As discussed herein, the HVAC units 21 may be configured to continuously supply air within the individual spaces to create a positive pressure environment to reduce the risk of cross-contamination with other spaces.

EXAMPLES

Illustrative examples of the mobile bunkhouse trailer disclosed herein are provided below. An embodiment of the mobile bunkhouse trailer may include any one or more, and any combination of, the examples described below.

Example 1 is a trailer with a trailer body defining an interior space. The trailer includes a bunk bed assembly within the interior space such that the bunk bed assembly comprises a lower bed and an upper bed. There are a plurality of barrier walls defining a first individual space that includes the lower bed and a second individual space that includes the upper bed. The trailer has a first door movably attached to the trailer body to access the first individual space and a second door movably attached to the trailer body to access the second individual space. The plurality of barrier walls prevent air flow between the first individual space and the second individual space, thereby isolating the first individual space and the second individual space from each other.

Example 2 includes the subject matter of Example 1, and wherein the trailer body includes a first exterior wall and a second exterior wall, wherein the first door is attached to the first exterior wall of the trailer body and the second door is attached to the second exterior wall.

Example 3 includes the subject matter of Examples 1-2, and wherein the first exterior wall and the second exterior wall extend approximately parallel with respect to each other.

Example 4 includes the subject matter of Examples 1-3, and wherein the lower bed and the upper bed extend approximately transverse to a longitudinal axis of the first exterior wall and the second exterior wall.

Example 5 includes the subject matter of Examples 1-4, and wherein the first door is aligned on the first exterior wall approximately opposite the second door on the second exterior wall.

Example 6 includes the subject matter of Examples 1-5, and wherein the plurality of barrier walls includes a first barrier wall that extends transversely to a longitudinal axis of the lower bed and the upper bed.

Example 7 includes the subject matter of Examples 1-6, and wherein the first barrier wall includes a first portion that extends between a floor and a ceiling of the first individual space and the second individual space.

Example 8 includes the subject matter of Examples 1-7, and wherein the first barrier wall includes a second portion that extends between the floor of the first individual space and the second individual space and the lower bed.

Example 9 includes the subject matter of Examples 1-8, and wherein the plurality of barrier walls includes a second barrier wall that extends approximately parallel to a longitudinal axis of the upper bed between a bottom of the upper bed and the ceiling.

Example 10 includes the subject matter of Examples 1-9, and wherein the plurality of barrier walls includes a third barrier wall that extends approximately parallel to a longitudinal axis of the upper bed between the lower bed and the upper bed.

Example 11 includes the subject matter of Examples 1-10, and wherein the second barrier wall and the third barrier wall combine to extend an entire length of the lower bed and the upper bed.

Example 12 includes the subject matter of Examples 1-11, and further comprising a first step assembly movable between a retracted position within the trailer and an extended position that provides a transition between an egress surface and the first door.

Example 13 includes the subject matter of Examples 1-12, and further comprising a second step assembly movable between a retracted position within the trailer and an extended position that provides a transition between an egress surface and the second door.

Example 14 includes the subject matter of Examples 1-13, and wherein the first step assembly moves in a first direction when moving to an extended position and the second step assembly moves in a second direction when moving to the extended position, wherein the first direction is opposite the second direction.

Example 15 includes the subject matter of Examples 1-14, and further comprising a first return vent within the first individual space to expel air out of the first individual space and a second return vent within the second individual space to expel air out of the second individual space.

Example 16 includes the subject matter of Examples 1-15, and further comprising at least one fresh air intake vent positioned remote from the first return vent and the second return vent to prevent introduction of air expelled out the first return vent and the second return vent from being introduced into the at least one fresh air intake vent.

Example 17 is a trailer with a trailer body defining an interior space. The trailer includes a plurality of bunk bed assemblies within the interior space such that each of the plurality of bunk bed assemblies include a lower bed and an upper bed. There are a plurality of barrier walls associated with each of the plurality of bunk bed assemblies, wherein the plurality of barrier walls define isolated interior spaces between the lower bed and the upper bed for each of the plurality of bunk bed assemblies. A first exterior door is provided that is movably attached to the trailer body to access a first individual space defined by the plurality of barrier walls. The trailer also includes a second exterior door movably attached to the trailer body to access a second individual space defined by the plurality of barrier walls. The plurality of barrier walls prevent air flow between the first individual space and the second individual space, thereby isolating the first individual space and the second individual space from each other.

Example 18 includes the subject matter of Example 17, and wherein the plurality of bunk bed assemblies comprise at least six bunk bed assemblies to provide 12 separate beds within the trailer body, wherein the plurality of barrier walls defines 12 isolated spaces within the trailer body corresponding each of the 12 separate beds.

Example 19 includes the subject matter of Examples 17-18, and further comprising a first set of six doors on a first side of the trailer body, wherein the six doors on the first side of the trailer body are configured to access six respective isolated spaces within the trailer body defined by the plurality of barrier walls.

Example 20 includes the subject matter of Examples 17-19, and further comprising a second set of six doors on a second side of the trailer body spaced apart from the first side, wherein the second set of six doors on the second side of the trailer body are configured to access six respective isolated spaces within the trailer body defined by the plurality of barrier walls.

The invention claimed is:

1. A trailer comprising
    a trailer body defining an interior space;
    a plurality of bunk bed assemblies within the interior space, wherein each of the plurality of bunk bed assemblies include a lower bed and an upper bed;
    a plurality of barrier walls associated with each of the plurality of bunk bed assemblies, wherein the plurality of barrier walls define isolated interior spaces between the lower bed and the upper bed for each of the plurality of bunk bed assemblies;
    a first exterior door movably attached to the trailer body to access a first individual space defined by the plurality of barrier walls;
    a second exterior door movably attached to the trailer body to access a second individual space defined by the plurality of barrier walls;
    wherein the plurality of barrier walls prevent air flow between the first individual space and the second individual space, thereby isolating the first individual space and the second individual space from each other; and
    wherein the first exterior door defines a first egress point for the first individual space, and further comprising a secondary egress point on a wall opposite the first exterior door to allow emergency egress from the first individual space.

2. The trailer of claim 1, wherein the plurality of bunk bed assemblies comprise at least six bunk bed assemblies to provide 12 separate beds within the trailer body, wherein the plurality of barrier walls defines 12 isolated spaces within the trailer body corresponding each of the 12 separate beds.

3. The trailer of claim 2, further comprising a first set of six doors on a first side of the trailer body, wherein the six doors on the first side of the trailer body are configured to access six respective isolated spaces within the trailer body defined by the plurality of barrier walls.

4. The trailer of claim 3, further comprising a second set of six doors on a second side of the trailer body spaced apart from the first side, wherein the second set of six doors on the second side of the trailer body are configured to access six respective isolated spaces within the trailer body defined by the plurality of barrier walls.

5. The trailer of claim 1, wherein the secondary egress point comprises at least one window on the wall opposite the first exterior door to provide emergency egress from the first individual space.

6. The trailer of claim 1, wherein the secondary egress point comprises at least one secondary egress door or hatch on the wall opposite the first exterior door to provide emergency egress from the first individual space.

* * * * *